United States Patent [19]
Randrup

[11] 3,871,515
[45] Mar. 18, 1975

[54] CONVEYOR DEVICE
[75] Inventor: Benjamin F. Randrup, Sebastopol, Calif.
[73] Assignee: F. Korbel and Brothers, Inc., Guerneville, Calif.
[22] Filed: Nov. 12, 1973
[21] Appl. No.: 414,815

[52] U.S. Cl. .................................. 198/287, 221/157
[51] Int. Cl. ............................................. B65g 47/24
[58] Field of Search..... 198/33 R, 33 AA, 287, 247; 221/157-160

[56]     References Cited
        UNITED STATES PATENTS

| | | | |
|---|---|---|---|
| 582,988 | 5/1897 | Hayte et al. | 198/33 R |
| 2,336,606 | 12/1943 | Everett | 198/33 AA |
| 2,649,214 | 8/1953 | Kirby et al. | 198/33 AA |
| 3,425,530 | 2/1969 | Carter | 198/33 AA |
| 3,469,672 | 9/1969 | Stutske et al. | 198/33 AA X |

Primary Examiner—Evon C. Blunk
Assistant Examiner—Douglas D. Watts
Attorney, Agent, or Firm—Warren, Rubin & Chickering

[57]     ABSTRACT

A conveyor assembly for the transport of work pieces from one station to another comprising a source hopper and a conveyor trough having a longitudinal recess therealong within which is carried one stretch of an endless chain equipped with work piece-engaging protrusions. A series of deflectors are connected to the trough proximate the chain conveyor so that as the work pieces are transported by the endless chain and work piece-engaging protrusions, the pieces are urged into end-to-end alignment, or deflected off of the chain conveyor altogether. Thus, the work pieces, such as corks for beverage bottles and the like, are finally delivered at the end of conveyor travel in a desired end-to-end alignment.

1 Claim, 6 Drawing Figures

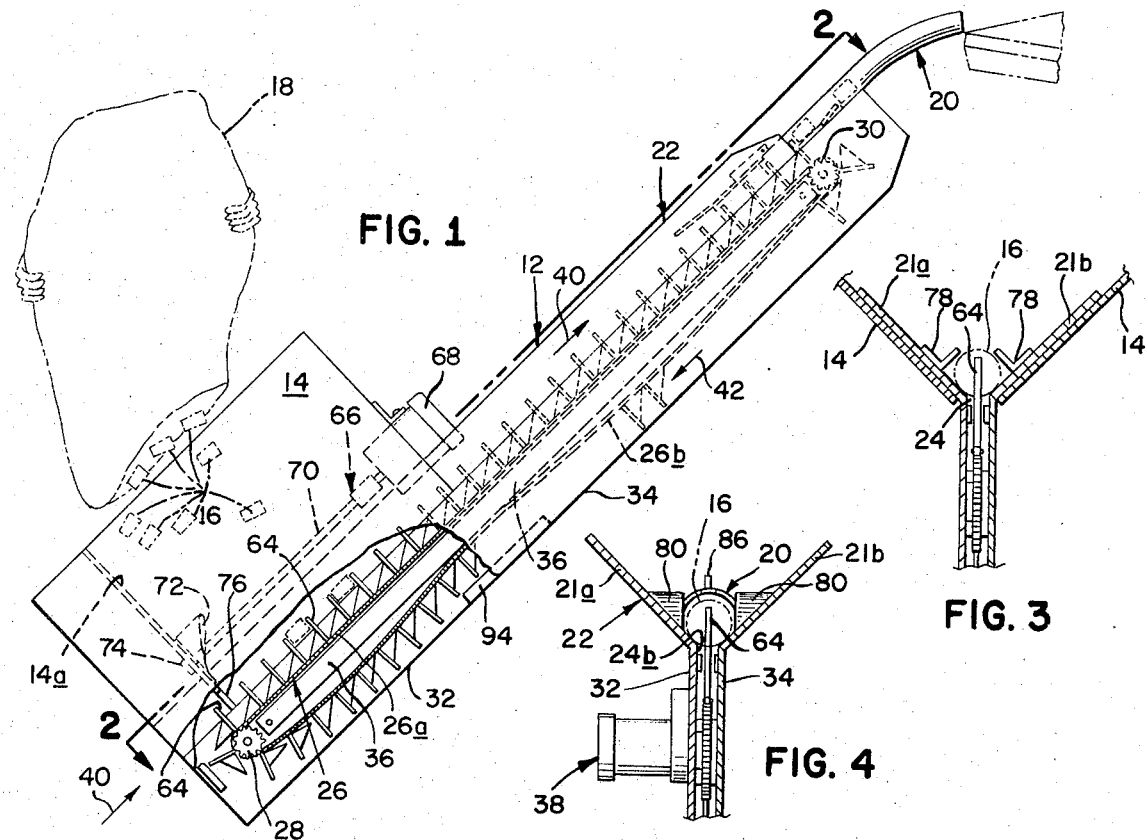
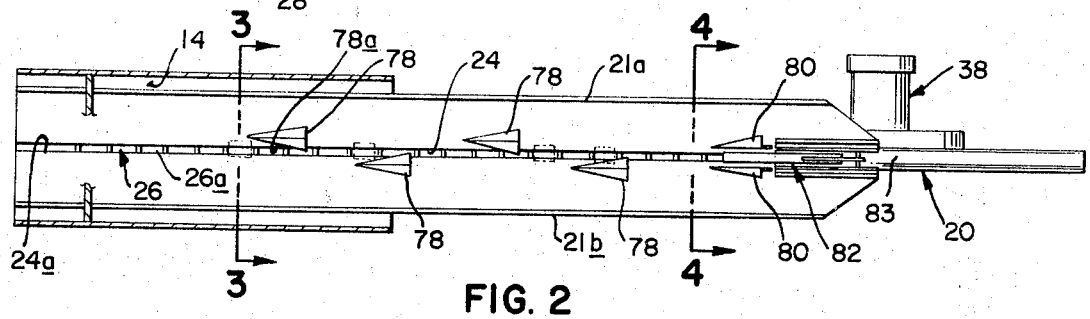
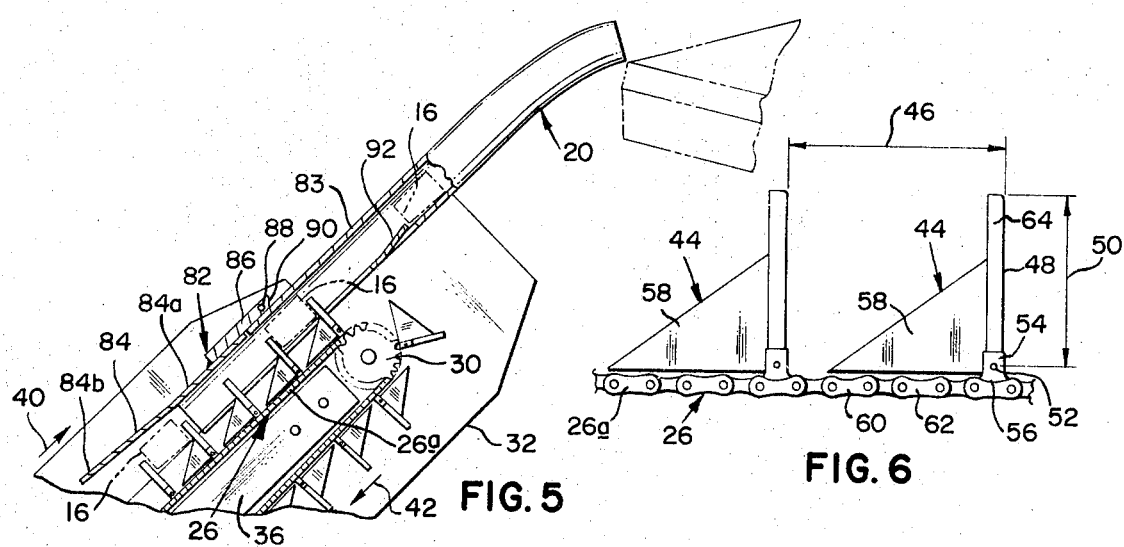

CONVEYOR DEVICE

This invention relates to conveyors, especially endless chain conveyors, and more particularly to devices of this type designed to transport work pieces having a consistent and indentifiable longitudinal shape, such as corks for beverage bottles and the like, in predetermined end-to-end alignment in the direction of movement from one station (source) to another station (discharge) for delivery of the aligned work pieces to a subsequent work station.

The present invention has as one of its main objects to provide a conveyor which may be applied generally to any number of applications where it is desirable to remove work pieces of the aforementioned type one by one from a randomly disposed source thereof, cause the work pieces to be aligned in end-to-end relationship, and transport and deliver such work pieces to a subsequent work station.

In the specification which follows, I describe my invention with reference to corks for wine bottles wherein my device may be used to pick such corks out of a random pile and deliver them in end-to-end alignment to a subsequent work station. The invention, however, may be applied to a wide variety of uniform, elongate work pieces; and to many aspects of industry, including bottling of wine, champagne and other beverages.

I have found my present invention especially useful in conjunction with the cork unscrambler device shown in my U.S. Pat. No. 3,687,263, for CORK UNSCRAMBLER by B. F. Randrup, patented Aug. 29, 1972. The device disclosed in that patent is capable of receiving randomly delivered corks, particularly corks about to be inserted in freshly filled champagne bottles, and thereafter not only align such corks but orient them as well so that the head end is always in a predetermined position. However, by placing the assembly of my present invention immediately before the input station of the unscrambler, so that the corks delivered thereto are all in end-to-end alignment, then the unscrambler can proceed to orient the corks i.e., place them all in a consistent and predetermined "heads up" position.

Thus it is a feature and advantage of my invention to cause existing devices which process work pieces, such as wine bottle corks, to operate with greater efficiency and speed than is presently possible without the use of my novel conveyor. However, as noted above, it should be appreciated that my present invention is entirely independent of my unscrambler device, may be used for still and sparkling wines within the vintner industry, and may have numerous applications outside of wine making as well.

A further feature and advantage of my invention, where initial conveyance of work pieces to a first work station is already required, is to provide desired end-to-end alignment without additional equipment, and without dependence on costly manual labor, which is also subject to human error, production interruptions, and other vicissitudes obviated by the use of automated mechanical devices.

Other objects, features, and advantages of my invention will become apparent to one of ordinary skill in the art upon reading the specification which follows, and with reference to the accompanying drawing, wherein FIG. 1 is a side elevational view of the conveyor device embracing my invention, with a portion of the lower trough and chain conveyor housing eliminated to reveal certain details therebehind with greater clarity;

FIG. 2. is a sectional view taken along line 2—2 of FIG. 1;

FIG. 3. is a sectional veiw taken along line 3—3 in FIG. 2;

FIG. 4 is a sectional view taken along line 4—4 in FIG. 2;

FIG. 5 is an enlarged (with respect to FIGS. 1-4) view of the upper end portion of the assembly shown in FIG. 1, the major part of the view being depicted sectionally to reveal more cleanly certain structural details thereof; and FIG. 6 is an enlarged view of a portion of the "endless" chain assembly of my invention, particularly disclosing a portion thereof related to my invention.

A general understanding of my invention may be gained by referring first to FIG. 1 which depicts conveyor assembly 12 having at the lower end thereof a receiving hopper or source station 14 into which an operator deposits work pieces 16 of the type having a consistent and identifiable longitudinal shape, such as corks for beverage bottles and the like. Such pieces typically are deposited into hopper 14 from a sack or box 18 in a randomly disposed pile therein. At the opposite end of the conveyor assembly 12 I provide a discharge station 20 described in greater detail hereinbelow. The discharge station may be located at the input to the cork unscrambler disclosed in my U.S. Pat. No. 3,687,263.

Assembly 12 includes a trough at 22 having sloping sides 21a, 21b shaped to define near the convergence thereof longitudinal recess 24 therealong (FIGS. 2 and 4) wherein one end 24a is positioned proximate source hopper 14 and the other end 24b is located in cooperative communication with the discharge station 20. An endless chain at 26 is mounted between and supported by heel sprocket 28 and head sprocket 30 located at opposite ends of conveyor assembly 26. The sprockets are rotatably mounted by conventional means between downwardly extending housing sides 32, 34 which, in the embodiment shown, are convenient extensions of sloping trough sides 21a, 21b; and further the sprockets are located so that upper stretch 26a of the endless chain is positioned throughout its run at a predetermined distance beneath longitudinal recess 24, for reasons which will become apparent hereinafter; and such positioning is supported by rail 36 secured by bolts or other conventional fasteners immediately below and in sliding contact throughout with chain stretch 26a (see also FIG. 5) to prevent chain sag. Head sprocket 30 is rotatably powered by electric gear motor assembly 38 which is conventionally coupled thereto and when energized drives endless chain 26 in the direction of arrows 40, 42, as will be further elaborated hereinafter.

It is a primary function of my novel conveyor assembly to individually engage work pieces, such as corks or the like, from the randomly disposed source thereof in hopper 14 and transport such pieces, one by one, at discharge station 20. This initial function of my device is accomplished by means of a plurality of prong assemblies 44 attached at uniform intervals 46 along the endless chain at 26 in a manner best observed by reference to FIG. 6.

Each prong assembly 44 comprises bar 48 having a preselected height 50, measured from pin connection 52 to the top of the prong. Each bar is of a width formed to cooperatively fit within tangs 54 of lug link 56, a plurality of which are installed as regularly spaced links in endless chain 26. In the preferred example illustrated, I use a standard roller chain readily available as a stock item from common industrial sources, but any uniform endless chain type assembly may be utilized in accordance with my invention.

Each prong or bar 48 is held upright by support plate 58 which may be secured by welding, brazing or mechanical connection to the bar while resting freely along the lower surface thereof on intermediate chain links 60, 62. Alternatively bars 48 may be fixed secured to lug links 56, but I prefer the use of support plates 58 which are relatively easy to fix in place and by their simple right triangular shape assure true upright positioning of the prongs.

Prong height 50 is selected so that the tip portion 64 thereof protrudes above trough longitudinal recess 24 just a sufficient amount to engage a single work piece in hopper 14, as the endless chain 26 moves along in the vicinity thereof in the direction of arrow 40. The generally sloped cross-sectional arrangement tends to encourage work pieces 16 to come to rest on the engaging prongs in an end-to-end alignment in respect of the direction of travel of the endless chain, and such orientation is the one desired when the work piece is finally delivered to discharge station 20.

Further, to assure that work pieces will constantly be deposited at the narrow bottom recess of the trough, and to prevent a static condition where pieces could remain unmoved and unengaged in the trough after initial engagement by the moving prongs with but a few of the many pieces awaiting transport from the hopper, I provide hopper agitator assembly 66 disclosed in FIG. 1.

The aforementioned assembly 66 comprises conventional gear motor 68 coupled by known expedients through shaft 70 to a preferred shaped agitator blade 72 secured to the shaft just inward of hopper inner wall 14a with the tail end of shaft 70 rotatably mounted in a standard bearing block 74. Rotation of the propeller-like shaped scoop blade 72 causes the latter to continually agitate work pieces 16 and urge the latter individually to tumble to the bottom of the hopper, into trough 22 and thereby to be serially and individually engaged by advancing prongs 48 which pass through slot 76 formed in inner wall 14a.

Despite the foregoing described expedients and subassemblies of my invention, it will be appreciated that work pieces, such as wine or champagne bottle corks being transported by my conveyor invention, will, from time to time, come to rest on various of prongs 48 in positions other than the desired end-to-end orientation that it is an important object of my invention to achieve by the time the corks are delivered to discharge station 20. To obtain this important and salutary feature of my invention, I provide fin deflectors 78 (FIGS. 2 and 3), final alignment wedges 80 (FIGS. 2 and 4), and vertical alignment tongue assembly 82 (FIGS. 1, 2 and 5), the latter being a part of the discharge station at 20.

Fin deflectors 78 comprise right angle cross-section flanges that are tapered to provide an angularly disposed plate edge positioned by attachment of the deflector to just clear a work piece when the latter is in end-to-end alignment on a prong bar 48 and just passing beneath the fin as the bar advances in the direction of arrow 40. If the work piece is in a non-aligned position on the prong, then a leading tapered edge 78a will either nudge the piece into proper alignment, or dislodge it altogether whence it will eventually either tumble or be carried back to source hopper 14 to begin its passage therefrom over again.

It should be recognized, of course, that work piece misalignment may occur to one side or the other of prong bars 48, so that a misaligned piece may miss a deflector fin 78 located on one side of trough 22. For this reason I provide a plurality of such fins on each side of the trough, i.e., at least one fin on each side but preferably two as shown in FIG. 2.

It is, of course, just barely possible that a work piece may survive passage between fins 78 and yet approach discharge station 20 in vertical misalignment. Moreover, just before entering discharge station 20, final alignment check of the work piece is desirable.

To achieve this purpose I provide final alignment wedges 80 and vertical alignment tongue assembly 82.

Final alignment wedges 80, best seen in FIGS. 2 and 4, form a constraint on either side of the chain conveyor at 26 just downwardly from the entrance to discharge conduit 82, one of the components of discharge station 20. A subtle nicety of this preferred embodiment of my invention, is that alignment wedges 80 are the same shaped fabrications as fins 78, but merely secured to the sides of the trough by the tapered edges thereof, rather than by one of the flat side surfaces as in the case of the fins, thus to form, as shown in sectional FIG. 4, a final entry constraint aligner to guide work pieces into conduit 20.

Vertical alignment tongue 82 essentially comprises upwardly sloped tongue 84 in the form of a bent bar which is pivotally mounted by means of lug 86 and pin 88 on top of conduit 83. Conduit 83 at the top input section thereof is slotted to flushly carry flat portion 84a of the tongue. Should a vertically misaligned work piece begin to enter conduit 83, gradual engagement therewith by bent portion 84b of tongue 84 will engage the piece, and gradually force the latter downwardly, in conformance with the profile of bar 84, until the piece is properly seated as it enters discharge conduit 83. Note the rounded end profile 90 of lug 86 which permits swinging movement of the tongue should a misaligned work piece engage the latter; or if movement is required during maintenance.

Conduit 83 is also provided with a slight barb 92 formed at the bottom thereof upward and away from the region where my endless chain conveyor is engaged by head sprocket 30 and returned to hopper 14. Barb 92 engages work pieces being advanced therealong by those behind, as the latter are delivered into conduit 83 and cannot retreat from nor jack-knife upon one another therein. Engagement with barb 92 prevents the full weight of a column of work pieces accumulated in the head end of conduit 83 from bearing back on the transport mechanism, thereby to cause possible jamming, overloading or other undesirable problems.

To prevent unnecessary frictional drag, or hangup, by return chain stretch 26b, I have found it desirable to provide support bar 94 to overcome the effects of chain sag therealong.

It should also be obvious to those of ordinary skill that the foregoing expedients described in connection with preventing work piece misalignment are additionally effective to prevent the delivery of more than one work piece at a time, wherein "piled on" pieces would invariably be misaligned. This is especially so considering the final delivery conduit which will only permit a single work piece to enter at a time.

While I have described the foregoing preferred embodiment of my invention without regard to specific materials, I prefer to use ordinary steel stock sheet and key-stock throughout for the various components thereof, standard roller chain, and conventional electrical gear motors, couplings and bearings. It should be apparent, however, to those skilled in the art that various advantageous substitutes of materials could be used, such as plastic sheeting or even plywood or fiberboard for siding and troughs, and other conventional expedients, even though the structure thereof would remain within the scope of the appended claims.

I claim:

1. A conveyor assembly to individually engage and carry work pieces of the type having an identifiable longitudinal shape, such as corks for bottles and the like, in end-to-end alignment in the direction of movement from a source station to a discharge station, wherein said pieces at said source station are randomly disposed therein, said assembly comprising:

a trough having a longitudinal recess therealong and means mounting said trough so as to position one end of said recess proximate said source station and the other end at said discharge station;

chain means mounted beneath said trough to provide a continous and movable stretch of chain immediately adjacent to and along said longitudinal recess from said source station to a terminus proximate said discharge station;

engaging means secured to said stretch of chain and extending through said longitudinal recess to engage said work pieces and transport the latter along the longitudinal recess of said trough;

at least two deflecting means secured to each side of said trough proximate the longitudinal recess thereof to deflect a work piece carried by said engaging means in other than end-to-end alignment in the direction of movement of said stretch of chain, thereby to realign the work piece in end-to-end alignment or dislodge the work piece from said engaging means and prevent delivery of the misaligned piece, said deflecting means comprising a pair of flanges at right angles to each other wherein the profile of the flat surfaces defines a pair of right triangles having one side and an apex in common and secured to the side of the trough with one flange with the apex facing the source station and with the tapered edge of the other flange positioned to contact work pieces that are not in end-to-end alignment;

further final alignment means located on the sides of said trough proximate the input end of said means to receive each of said work pieces to urge the latter into said end-to-end alignment;

means including a conduit shaped to receive each of said work pieces in end-to-end alignment upon arrival at said discharge station and securing said conduit in alignment with said longitudinal recess, and remove said pieces in such alignment and cause delivery thereof to a subsequent work station;

means secured to said conduit at the end thereof wherein said work pieces enter, said means adapted to impinge on a work piece transported therealong when such work piece is misaligned in a vertical direction in respect to end-to-end alignment; and driving means to cause said stretch of chain to be continuously moved from said source station to said discharge station, and back again.

* * * * *